(12) United States Patent
Pachlore et al.

(10) Patent No.: US 10,452,419 B2
(45) Date of Patent: Oct. 22, 2019

(54) DEVICE VIRTUALIZATION FOR CONTAINERS

(71) Applicants: Mohanish Chandrapalsingh Pachlore, Waterloo (CA); Dongjin Kim, Waterloo (CA); Yin Tan, Waterloo (CA)

(72) Inventors: Mohanish Chandrapalsingh Pachlore, Waterloo (CA); Dongjin Kim, Waterloo (CA); Yin Tan, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 158 days.

(21) Appl. No.: 15/261,128

(22) Filed: Sep. 9, 2016

(65) Prior Publication Data

US 2018/0074839 A1  Mar. 15, 2018

(51) Int. Cl.
*G06F 9/455* (2018.01)
*H04W 84/12* (2009.01)
*G06F 9/445* (2018.01)

(52) U.S. Cl.
CPC .......... *G06F 9/45558* (2013.01); *G06F 9/445* (2013.01); *H04W 84/12* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| 2006/0215556 | A1* | 9/2006 | Wu ........................ H04W 4/12 370/230 |
| 2007/0067769 | A1 | 3/2007 | Geisinger |
| 2008/0123536 | A1 | 5/2008 | Johnson et al. |
| 2008/0151779 | A1 | 6/2008 | Johnson et al. |
| 2008/0151893 | A1 | 6/2008 | Nordmark et al. |
| 2011/0161988 | A1 | 6/2011 | Kashyap |
| 2011/0321042 | A1 | 12/2011 | Yang et al. |
| 2014/0324793 | A1* | 10/2014 | Glazemakers ........ G06F 3/0641 707/692 |

(Continued)

FOREIGN PATENT DOCUMENTS

| CN | 104506404 A | 4/2015 |
| CN | 105808320 A | 7/2016 |

OTHER PUBLICATIONS

Dall, Christoffer et al., The Design, Implementation, and Evaluation of Cells: A Virtual Smartphone Architecture, ACM Transactions on Computer Systems, vol. 30, No. 3, Article 9, Aug. 2012.

(Continued)

*Primary Examiner* — Kenneth Tang
(74) *Attorney, Agent, or Firm* — Norton Rose Fulbright Canada LLP (57) ABSTRACT

The present disclosure provides systems, methods, and computer-readable media for setting up a network. A plurality of virtual devices are created. Each one of the virtual devices is associated to a corresponding virtual container. Then, the virtual devices are connected to a real device, which is associated with a host container, in order to enable communication between the virtual devices and the real device across a namespace of the network.

16 Claims, 9 Drawing Sheets

(56) References Cited

U.S. PATENT DOCUMENTS

2016/0378518 A1* 12/2016 Antony .............. G06F 9/45533
                                                                                                    718/1
2018/0007556 A1* 1/2018 Lu ..................... G06F 21/606
2018/0060740 A1* 3/2018 Bradley ............... G06N 5/025

OTHER PUBLICATIONS

Extended European search Report, Application No. 17 848 094.3, Ref.: MTH00368EP.

* cited by examiner

DEVICE VIRTUALIZATION FOR CONTAINERS

TECHNICAL FIELD

The present disclosure relates generally to virtual machines, and more specifically to techniques for providing resources to virtual containers.

BACKGROUND OF THE ART

Virtualization is a technique which allows, inter alia, for running one or more isolated user-space instances, called virtual containers, on a host computing system. A particular host computing system can run multiple virtual containers, and the virtual containers are managed by a host container. Each virtual container is provided access to a share of computing resources, including processor cycles, memory, and the like, to emulate a particular set of hardware running a particular operating system (OS) and being configured to execute a particular set of software. To segregate virtual containers, each is provided with a respective namespace.

During use, the host container is transparent to the user of the virtual container, and the virtual container may be used to run any suitable number of applications. In certain instances, one or more applications running within the virtual container request access to one or more device-based resources through the OS of the virtual container. For example, a web-based application requests access to an internet connection as provided by a WiFi or Ethernet device. Although an OS of a standalone computer (i.e., non-virtualized) may interact directly with various hardware components, for example through drivers in the kernel, a virtual container is typically provided with an interface, for example a hypervisor, through which the OS of the virtual container may access certain hardware elements.

However, an OS of a virtual container can only access a device-based resource if the device is visible to the operating system. Some device-based resources, for example wireless adapters, are not configured to be visible across multiple namespaces. Thus, in typical virtualization scenarios, only an active virtual container can access such device-based resources. Additionally, a host computing device typically has only a single one of each device. If a particular host computing system runs two virtual containers, only the active virtual container can access device-based resources, and an inactive virtual container is precluded from accessing device-based resources until it is made the active virtual container. Thus, only the OS of the active virtual container can access a WiFi adapter or other networking device, and any application running in the inactive virtual container is prevented from accessing network resources provided by the WiFi adapter.

As such, there is a need for providing access to device-based resources to all virtual containers running on a host computing system.

SUMMARY

The present disclosure provides systems, methods, and computer-readable media for setting up a network. A plurality of virtual devices are created. Each one of the virtual devices is associated with a corresponding virtual container. The virtual devices are connected to a real device, which is associated with a host container, in order to enable communication between the virtual devices and the real device across a namespace of the network.

In accordance with a broad aspect, there is provided a method for setting up a network, comprising: creating a plurality of virtual devices; associating each one of the virtual devices with a corresponding virtual container; and connecting the virtual devices to a real device associated with a host container to enable communication between the virtual devices and the real device across a namespace of the network.

In some embodiments, the real device and the virtual devices are wireless devices.

In some embodiments, the virtual devices are virtual copies of the real device.

In some embodiments, each of the virtual devices comprises a physical WiFi device interface and a wireless LAN device interface.

In some embodiments, creating a plurality of virtual devices comprises causing a virtual driver to create multiple instances of the virtual device.

In some embodiments, the virtual driver is one of a FullMAC driver and a SoftMAC driver.

In some embodiments, the method further comprises causing the host container to instantiate the plurality of virtual containers, each having an associated namespace.

In some embodiments, the plurality of virtual containers belong to one of a first group of containers and a second group of virtual containers, and the first and second groups of virtual containers run different operating systems.

In some embodiments, the method further comprises managing conflict between the virtual containers via virtual drivers of the virtual devices.

In some embodiments, the method further comprises managing conflict between the virtual containers via an arbiter in the host container, which manages the virtual containers.

According to another broad aspect, there is provided a system for setting up a network. The system comprises a processing unit and a non-transitory memory communicatively coupled to the processing unit and comprising computer-readable program instructions. The program instructions are executable by the processing unit for creating a plurality of virtual devices; associating each one of the virtual devices with a corresponding virtual container; and connecting the virtual devices to a real device associated with a host container to enable communication between the virtual devices and the real device across a namespace of the network.

In some embodiments, the real device and the virtual devices are wireless devices.

In some embodiments, the virtual devices are virtual copies of the real device.

In some embodiments, each of the virtual devices comprises a physical WiFi device interface and a wireless LAN device interface.

In some embodiments, creating a plurality of virtual devices comprises causing a virtual driver to create multiple instances of the virtual device.

In some embodiments, the program instructions are further executable for causing the host container to instantiate the plurality of virtual containers, each having an associated namespace.

In some embodiments, the plurality of virtual containers belong to one of a first group of containers and a second group of virtual containers, and the first and second groups of virtual containers run a different operating system.

In some embodiments, the program instructions are further executable for managing conflict between the virtual containers via virtual drivers of the virtual devices.

In some embodiments, the program instructions are further executable for managing conflict between the virtual containers via an arbiter in the host container, which manages the containers.

According to a further broad aspect, there is provided a computing network comprising: at least one host container hosting at least two virtual containers and having access to at least one real device; at least one real device accessible by the at least one host container; and a virtual device associated with each one of the at least two virtual containers and connected to the at least one real device to enable communication between the virtual devices and the real device across a namespace of the network.

Features of the systems, devices, and methods described herein may be used in various combinations, and may also be used for the system and computer-readable storage medium in various combinations.

BRIEF DESCRIPTION OF THE DRAWINGS

Further features and advantages of embodiments described herein may become apparent from the following detailed description, taken in combination with the appended drawings, in which.

It will be noted that throughout the appended drawings, like features are identified by like reference numerals.

DETAILED DESCRIPTION

Computers are equipped with various real devices to allow access to different resources. For example, a computer can have an Ethernet adapter, one or more wireless network adapters (WiFi, Bluetooth™, etc.), one or more Universal Serial Bus (USB) adapters, and the like. The present disclosure provides methods and systems for providing access to a real device when the computer is running multiple operating systems in corresponding virtual containers. Virtualized copies of the real device are created and associated with each of the virtual containers. The virtualized copies are then connected to the real device to allow communication between the real device and virtualized copies.

Figure 1:
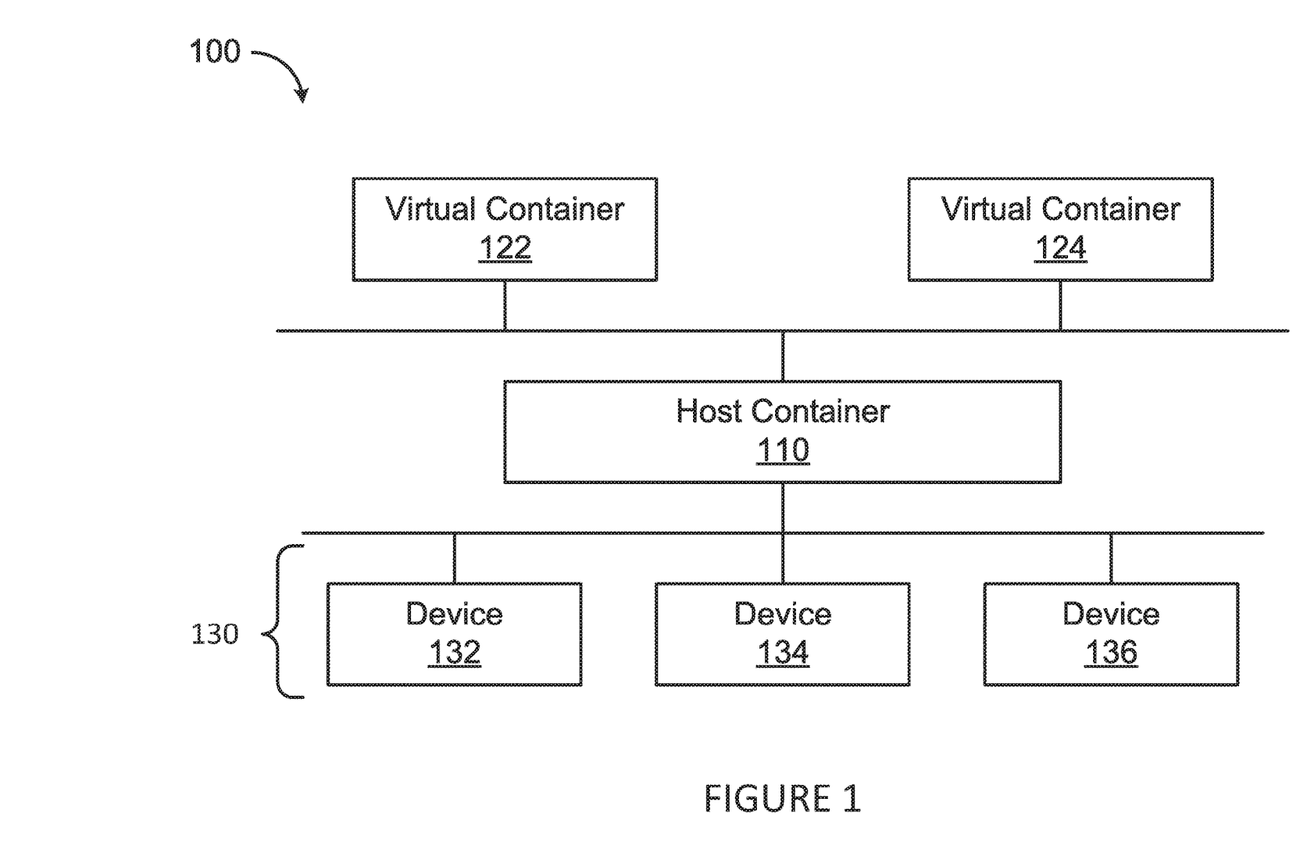
FIG. 1 is a block diagram of an example virtualization system.

With reference to FIG. 1, an example container management system 100 is shown. The container management system 100 can be implemented by any suitable computing device, including desktop or laptop computers, mainframes, servers, smartphones or other mobile devices, and the like. The container management system 100 implements a host container 110 and provides access to one or more real devices 132, 134, 136, collectively the devices 130. The devices 130 can be located in the namespace of the host container 110 or in a separate namespace, and the host container 110 can provide access to the devices 130. The container management system 100, and more specifically the host container 110, is configured for hosting one or more virtual containers 122, 124. It should be noted that although FIG. 1 illustrates three (3) real devices 132, 134, 136, and two (2) virtual containers 122, 124, the container management system 100 can provide access to any suitable number of devices, and can host any suitable number of virtual containers.

The host container 110 and the virtual containers 122, 124 can be any suitable type of container and can run any suitable kind of operating system (OS). In some embodiments, the host container 110 is a root container configured for running a master process which manages an allocation of resources to the virtual containers 122, 124. In some further embodiments, the master process is also configured for instantiating the virtual containers 122, 124. The virtual containers 122, 124 can be instantiated at any suitable time using any suitable means. The OS of the host container 110 runs on a host kernel (not illustrated), which can be any suitable kernel. In other embodiments, the host container 110 is a base virtual container, the virtual containers 122, 124 are hosted in the base virtual container, and the base virtual container is hosted by a separate root container. Each of the real devices 132, 134, 136 can be located in the namespace of the root container or of the base virtual container.

The virtual containers 122, 124, are provided with various computing resources, including processor cycles, memory, and the like, and are managed by the host container 110. The virtual containers 122, 124 may run a common OS, or may run different OS which share a common kernel. For example, virtual container 122 runs Android version 7.0 (Nougat) and virtual container 124 runs Android version 6.0 (Marshmallow). As another example, virtual container 122 runs Windows 10 and virtual container 124 runs Windows 7. The virtual containers 122, 124, can be managed by the host container 110, and can access computing resources via any suitable hypervisor or other container management technology. The virtual containers 122, 124, are configured for running any number of applications which make use of the computing resources provided by the host container 110.

The host container 110 and the virtual devices 122, 124 are each located in a respective namespace. A namespace is an abstract environment which holds a logical grouping of unique identifiers or symbols. Put differently, a namespace groups computer resources, applications, files, and the like, based on the container to which they belong. Thus, the resources available to the host container 110, including the devices 130, are in the namespace of the host container 110, and the resources available to the virtual devices 122, 124 are located in their respective namespaces. At any given time, only one of the virtual containers 122, 124 is the active virtual container, and all other virtual containers are inactive. The active virtual container is the virtual container 122 or 124 currently being used, for example, by a user of the container management system 100.

The real devices 130 can include any suitable type of device which provides a computing resource. The computing resources can be used by an application running in the virtual containers 122, 124, or an application running in the host container 110. For example, real device 132 is a networking device, e.g. a WiFi device, an Ethernet device, a Bluetooth™ device, and the like. As another example, real device 134 is a location device, e.g. a global positioning system (GPS) device, augmented GPS device, wireless-assisted GPS device, and the like. As another example, real device 136 is a data transfer device, e.g. a universal serial bus (USB) port, a serial AT attachment (SATA) port, a Lightning port, and the like. Still other devices are considered.

Figure 2:
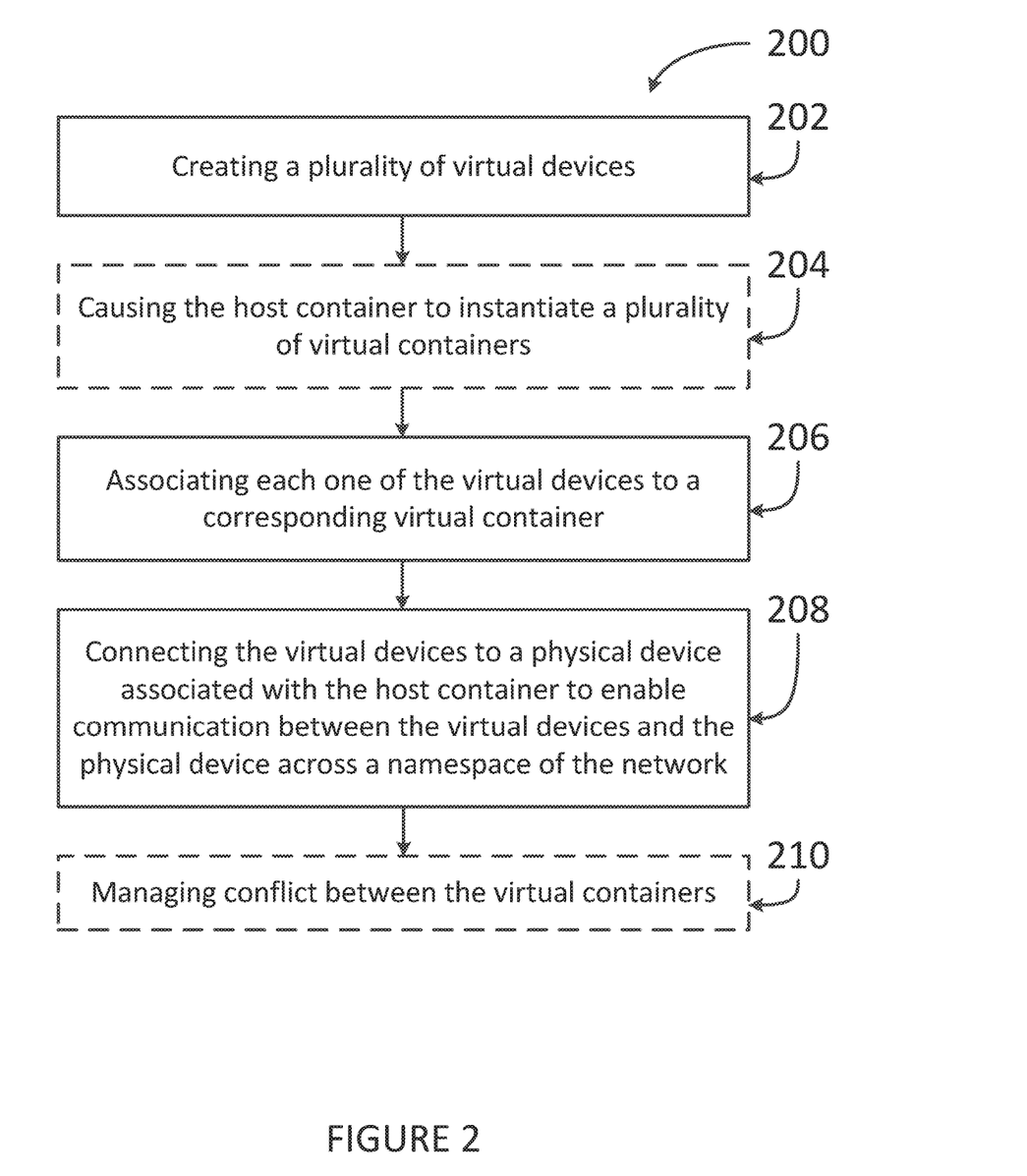
FIG. 2 is a flowchart of a method for managing GPU allocation for a virtual container in accordance with an embodiment.

With reference to FIG. 2, there is provided a method 200 for setting up a network which connects a plurality of virtual containers, for example the virtual containers 122, 124, to one of the devices 130, for example real device 132. At step 202, a plurality of virtual devices are created. In some embodiments, one virtual device is created for each of the virtual containers 122, 124. In some embodiments, the virtual devices are copies of real device 132. Alternatively, the virtual devices are versions of real device 132 modified in any suitable way. For example, the virtual devices are modified to include arbitration protocols, as described hereinbelow. The virtual devices are created in the same namespace as the host container 110. In some embodiments, the virtual devices are created by a virtual driver. A virtual driver can be another instance of a real driver. The virtual driver can be a copy of the real driver, or can be a modified version of the real driver. The real driver can be modified in any suitable way, for example to provide the virtual driver with information required to communicate with a separate real driver and/or to invoke separate module or commands to communicate across namespace boundaries.

In some embodiments, execution of the method 200 begins with no virtual containers instantiated. Therefore, at step 204, optionally the host container 110 is caused to instantiate the plurality of virtual containers 122, 124. The virtual containers 122, 124 may be instantiated by the host container 110 directly, or may be instantiated by a master process thereof. Each of the virtual containers 122, 124 is instantiated in a respective namespace separate from the namespace of the host container 110. In other embodiments, the virtual containers 122, 124 are already instantiated upon execution of the method 200, and step 204 is not performed.

At step 206, each of the virtual devices is associated with a corresponding one of the virtual containers 122, 124. The virtual devices are associated with a corresponding virtual container by changing the namespace of each of the virtual devices to the namespace of the corresponding one of the virtual containers 122,124. By changing the namespace of the virtual devices, the virtual devices become accessible to the virtual containers 122, 124.

At step 208, the virtual devices are connected to the real device 132. Connecting the virtual devices and the real device 132 enables communication between the virtual devices and the real device 132 across a namespace of the network, specifically the namespace of the host container 110. In some embodiments, the connection is performed by providing a pointer to the real device 132 to the virtual drivers of the virtual devices. In some embodiments, the virtual devices and the real device 132 are connected via the host kernel. Thus, by creating virtual devices for each of the virtual containers 122, 124, the virtual containers can access the real device 132 through their respective virtual device even when inactive.

At step 210, optionally, conflict between the virtual containers 122, 124 is managed. Management of conflict can be performed by the virtual devices, by the real device 132, by the host container 100, or by the host kernel. For example, the real device 132 is configured to indicate to the virtual devices that the real device 132 is overloaded and/or cannot process additional requests for access to the real device 132. Communication between the real device 132 and the virtual devices can be performed, for example, via the virtual drivers. In another example, the host container 110 is configured for intercepting communication between the virtual devices and the real device 132 and can delay and/or pause communications which would overload the real device 132. Still other methods for arbitration are considered.

Once connected to the real device 132, the virtual devices in the namespaces of the virtual containers 122, 124 appear as a real device to the OS of the virtual containers 122, 124. This allows the OS of the virtual containers 122, 124, to access the computing resource provided by the real device 132, even in the event that the virtual container 122 or 124 is not the active container. Moreover, because the virtual devices are placed in the kernel space of the namespace of the virtual container 122, 124, no changes need to be made to the user space of the virtual containers 122, 124. Therefore, the method 200 can be used for any OS that uses a particular kernel, even if the OS is upgraded or modified.

Figure 3:
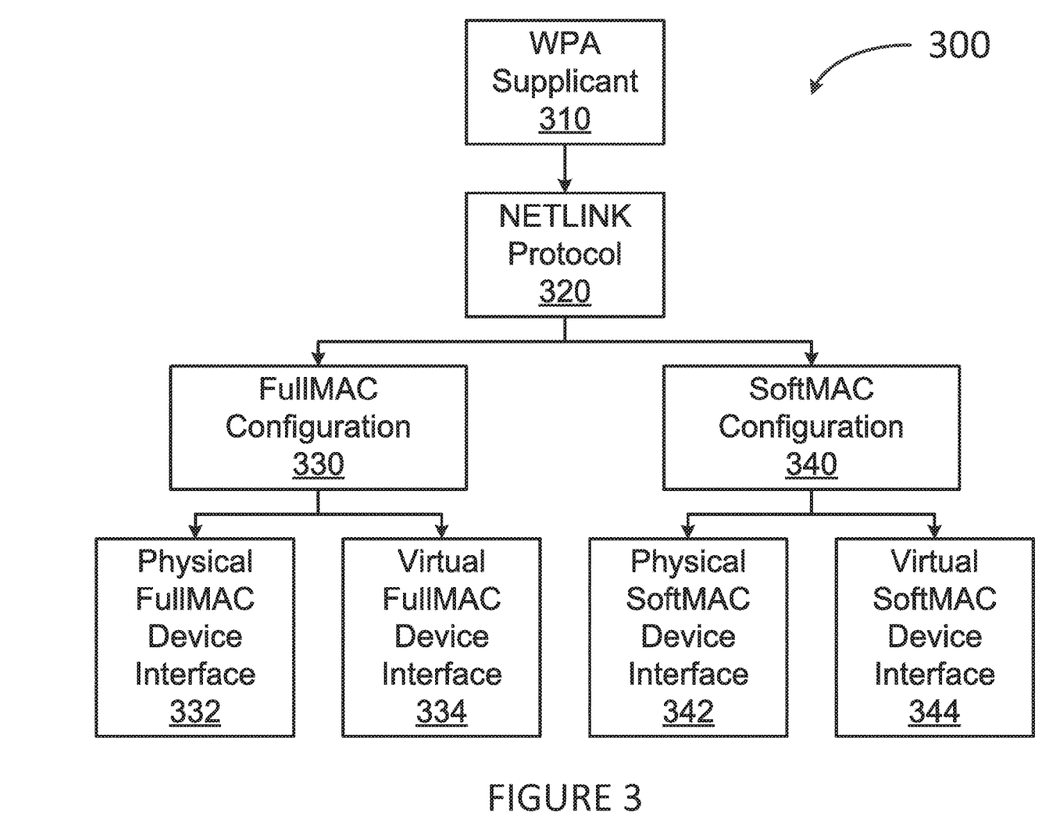
FIG. 3 is a block diagram of an example stack.

In some embodiments, the real device 132 which is virtualized for the virtual containers 122, 124 is a WiFi device which provides wireless network access. For example, the real device 132 is a WiFi adapter providing internet access. With reference to FIG. 3, an example WiFi stack 300 is illustrated. Different configurations of the WiFi stack 300 are implemented in each of the host container 110 and the virtual containers 122, 124.

A WiFi Protected Access (WPA) supplicant 310 is implemented in a user space of each of the host container 110 and the virtual containers 122, 124. The WPA supplicant 310 is an entity which configures and controls the WiFi device of the container implementing the WPA supplicant 310. Additionally, a NETLINK protocol 320 is implemented in a kernel space of each of the host container 110 and the virtual containers 122, 124. The NETLINK protocol 320 acts as a mediator between the WPA supplicant 310 and a kernel space WiFi configuration, described hereinbelow.

Depending on the nature of the WiFi device, one of a FullMAC configuration 330 and a SoftMAC configuration 340 is implemented as part of the WiFi stack 300. A FullMAC configuration 330 is implemented in embodiments where the real device 132 implements a media access control (MAC) sublayer management entity (MLME) in hardware or firmware. A SoftMAC configuration 340 is implemented when the MLME is implemented in software, either in the real device 132 or in the OS or kernel of the container implementing the WiFi stack 300.

The WiFi stack 300 also includes a device interface, which can be a FullMAC or SoftMAC device interface. Additionally, the device interface can be a physical or a virtual device interface. For example, the host container 110 uses real device 132 which implements a FullMAC configuration 330, and thus implements physical FullMAC device interface 332. The virtual containers 122, 124 hosted by the host container 110 implement virtual FullMAC device interfaces 334. In another example, the host container 110 uses real device 134 which implements a SoftMAC configuration 330, and thus implements physical SoftMAC device interface 342. The virtual containers 122, 124 hosted by the host container 110 implement virtual SoftMAC device interfaces 344.

In other embodiments, the real device virtualized for the virtual containers 122, 124 is another wireless device, such as a Bluetooth™ device, a ZigBee™ device, or any other suitable wireless device, and each of the host container 110 and the virtual containers 122, 124 implement an appropriate stack. In still other embodiments, the real device virtualized for the virtual containers is a location device, or a data transfer device, or any other suitable device. The host container 110 and the virtual containers 122, 124 are configured to implement appropriate stacks, interfaces, drivers, and the like, for using the physical and virtualized devices.

Figure 4:
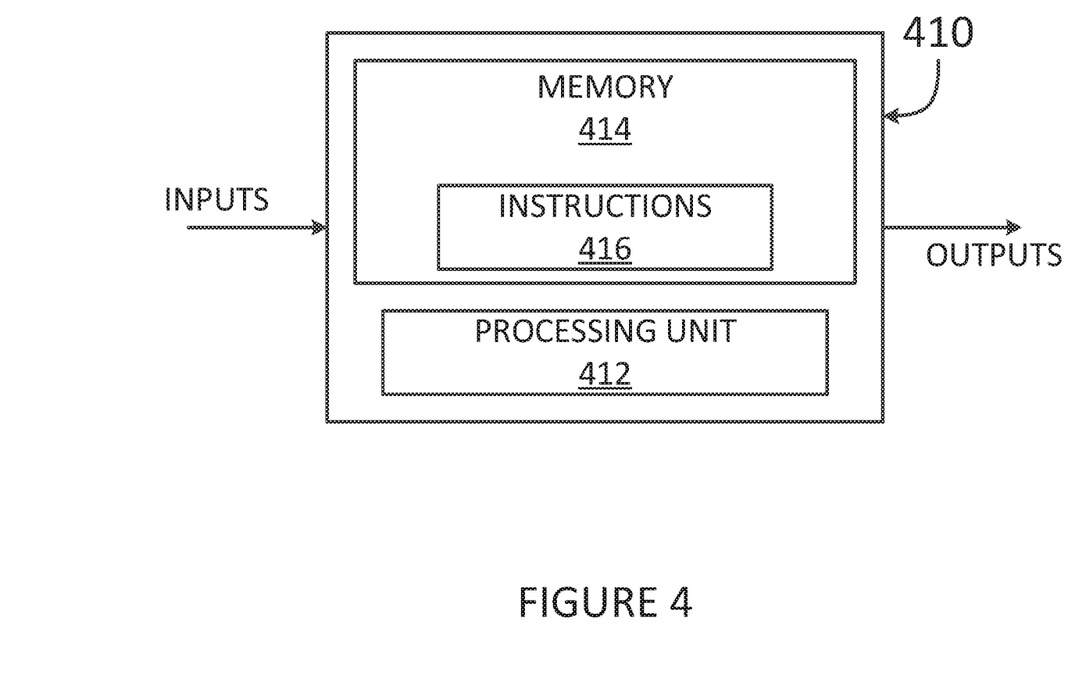
FIG. 4 is a block diagram of an example computer system for implementing a virtualization system.

With reference to FIG. 4, the method 200 may be implemented by a computing device 410, comprising a processing unit 412 and a memory 414 which has stored therein computer-executable instructions 416. The processing unit 412 may comprise any suitable devices configured to cause a series of steps to be performed so as to implement the method 200 such that instructions 416, when executed by the computing device 410 or other programmable apparatus, may cause the functions/acts/steps specified in the methods described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

In some embodiments, the computing device 410 may communicate with other computing devices in various ways, including directly and indirectly coupled over one or more networks. The networks are capable of carrying data. The networks can involve wired connections, wireless connections, or a combination thereof. The networks may involve different network communication technologies, standards and protocols, for example Global System for Mobile Communications (GSM), Code division multiple access (CDMA), wireless local loop, WiMAX, Wi-Fi, Bluetooth, Long Term Evolution (LTE) and so on. The networks may involve different physical media, for example coaxial cable, fiber optics, transceiver stations and so on. Example network types include the Internet, Ethernet, plain old telephone service (POTS) line, public switched telephone network (PSTN), integrated services digital network (ISDN), digital subscriber line (DSL), and others, including any combination of these. The networks can include a local area network and/or a wide area network.

Figure 5A:
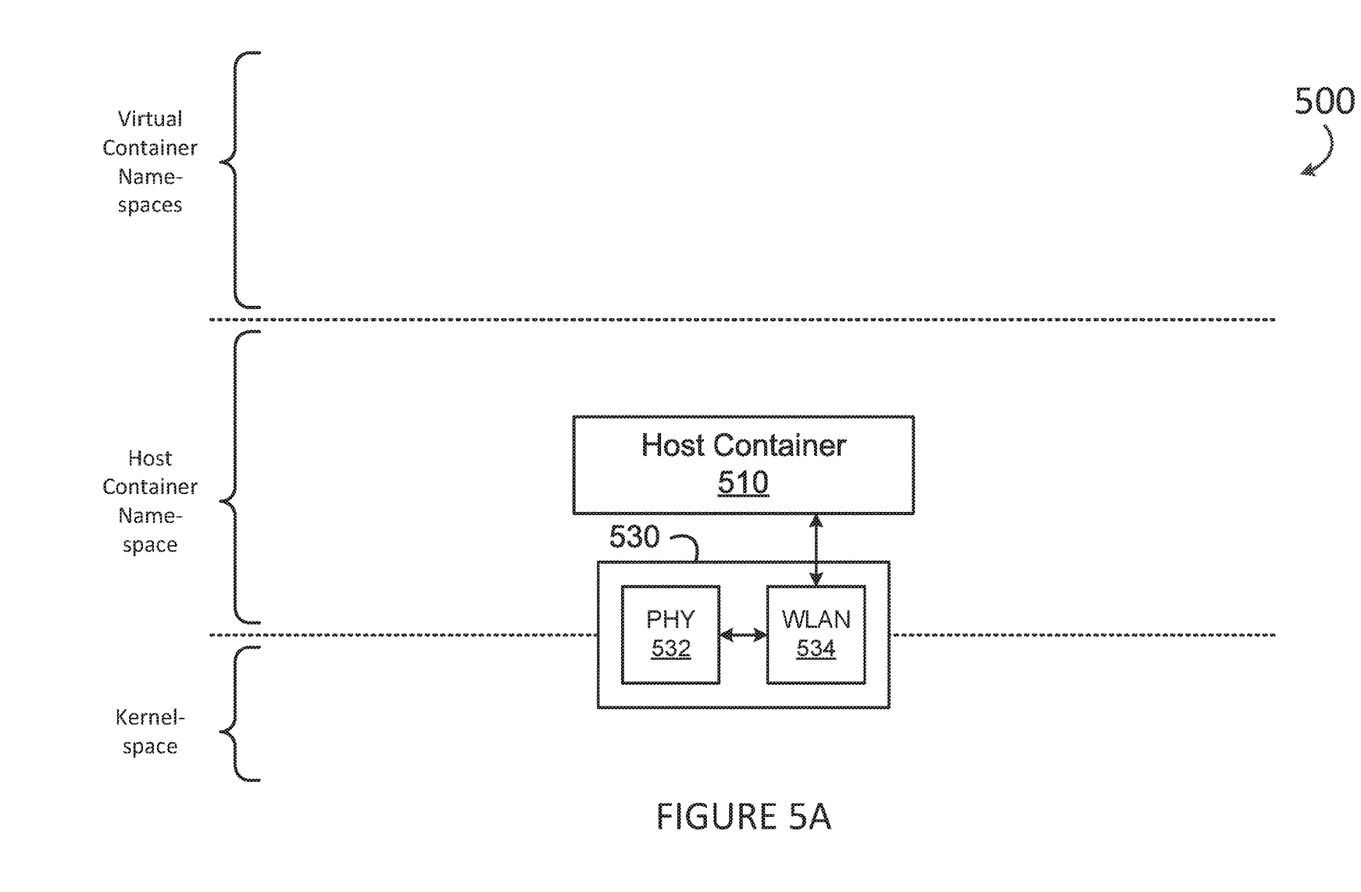
FIGS. 5A-5E are block diagrams of an example virtualization system executing an embodiment of the method of FIG. 2.

With reference to FIG. 5A, there is shown an example computing network 500 comprising a host container 510 located in a host container namespace. The computing network 500 also comprises a WiFi device 530. The computing network 500 is setup to connect a plurality of virtual containers to a real device, such as the WiFi device 530, in accordance with the method 200.

The WiFi device 530 has two main components, a physical WiFi device interface (PHY) 532 and a wireless local area network device interface (WLAN) 534. The PHY 532 and the WLAN 534 together provide an interface between the hardware of the WiFi device 530 and the OS of the host container 510. Thus, the host container 510 can direct requests for WiFi resources to the WiFi device 530 to, for example, access the internet.

Figure 5B:
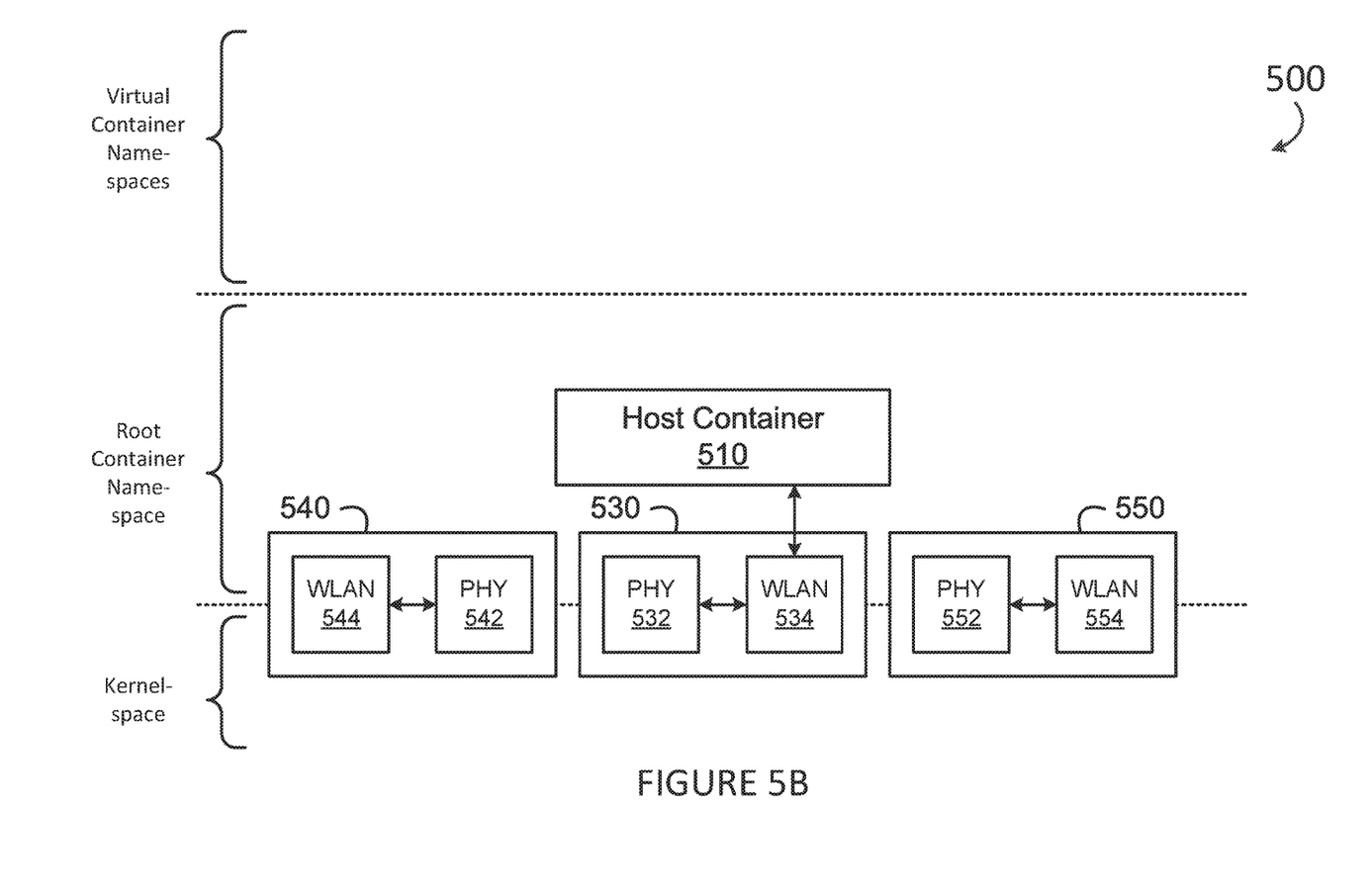

With reference to FIG. 5B, in the computing network 500, there is created a plurality of virtual devices 540, 550 in accordance with step 202. The virtual devices 540, 550, can be created using any suitable means, and are created in the host container namespace. In some embodiments, the virtual devices 540, 550, are created by the host container 510. In some embodiments, the virtual devices 540, 550, are copies of the WiFi device 530, with respective PHY 542, 552 and WLAN 544, 554. The PHY 542, 552 and WLAN 544, 554 are virtual copies of the PHY 532 and WLAN 534 of the WiFi device 530. In other embodiments, the virtual devices 540, 550 are modified versions of the WiFi device 530.

Figure 5C:
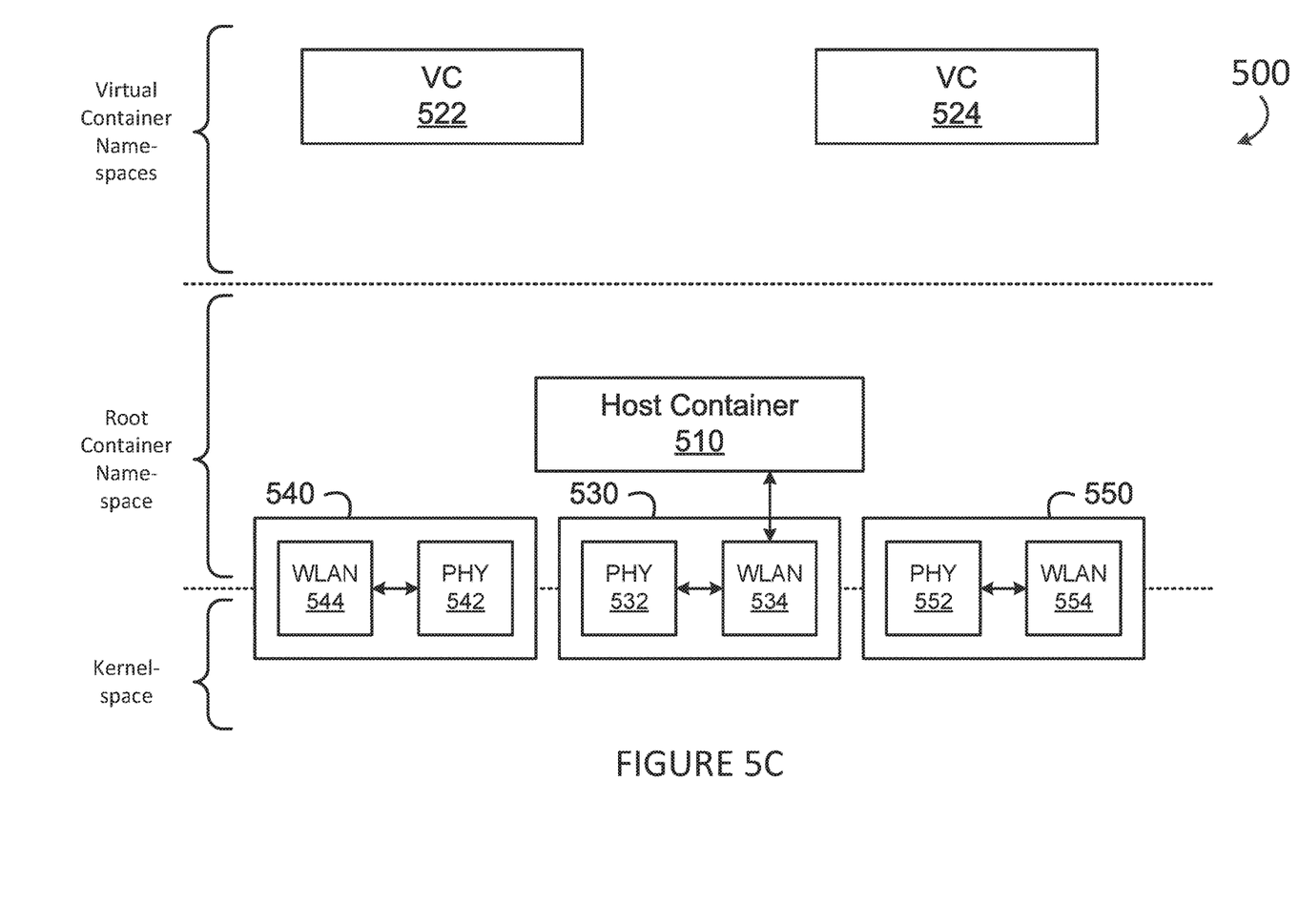

With reference to FIG. 5C, optionally, the host container 510 instantiates a plurality of virtual containers 522, 524, in accordance with step 204. The virtual containers 522, 524 can be instantiated in any suitable way, and are instantiated in respective virtual container namespaces. In some embodiments, the virtual containers 522, 524 are instantiated by the host container 510, or by a master process thereof, if the host container 510 is a root container. In some embodiments, the virtual containers 522, 524 run a common OS. In other embodiments, the virtual containers 522, 524 run different OS which use a common kernel. Any number of virtual containers can be instantiated by the host container 510. In some embodiments, the virtual containers 522, 524 are already instantiated when the method 200 begins.

Figure 5D:
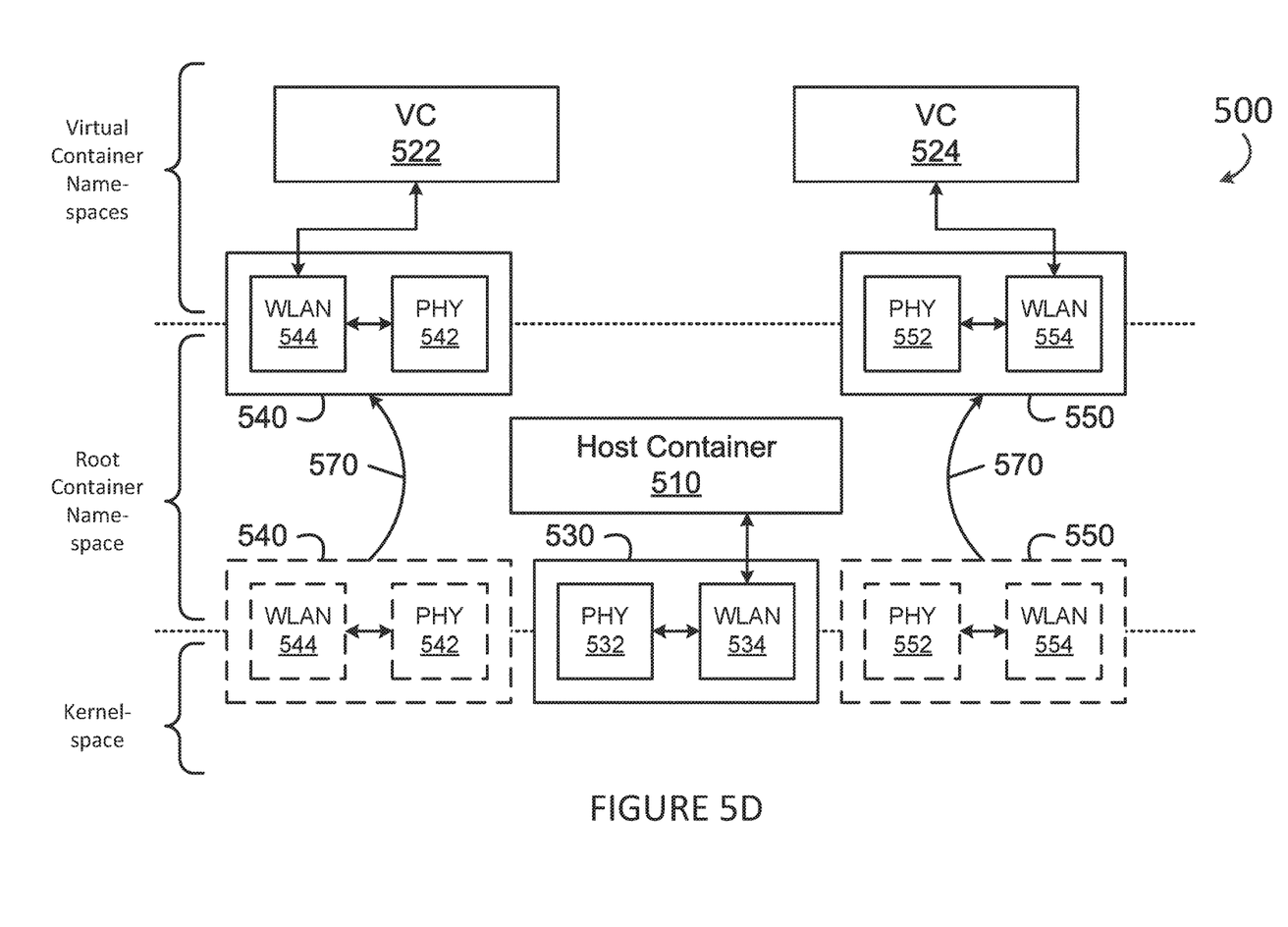

With reference to FIG. 5D, each one of the virtual devices 540, 550 is associated with a corresponding virtual container 522, 524, respectively, as per step 206. The virtual devices 540, 550 are associated with their respective virtual containers 522, 524 by changing the namespace of the virtual devices, as illustrated by arrows 570. More specifically, the namespace of virtual device 540 is changed to that of virtual container 522, and the namespace of virtual device 550 is changed to that of virtual container 524.

Figure 5E:
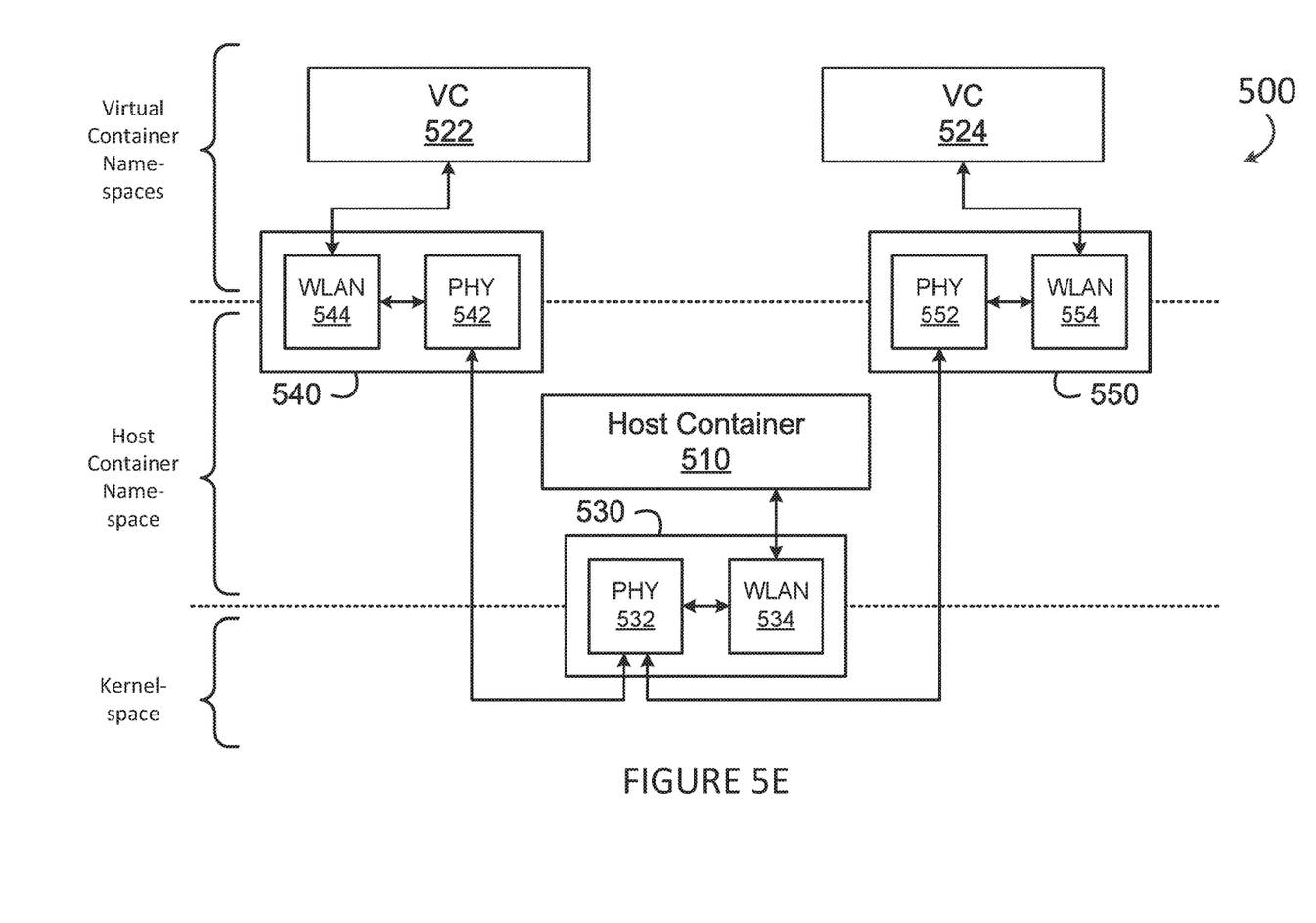

With reference to FIG. 5E, the virtual devices 540, 550 are connected to the WiFi device 530, as per step 208. The WiFi device 530 is associated with a host container 510 by virtue of being in the namespace of the host container 510. For example, the WiFi device 530 is connected with the virtual devices 540, 550 via the kernel space of the host container 510. Connecting the virtual devices 540, 550 to the WiFi device 530 enables communication between the virtual devices 540, 550 and the WiFi device 530 across a namespace of the network. This also allows the virtual containers 522, 524 to use the computing resource provided by the WiFi device 530 via the virtual devices 540, 550.

The system for setting up a network and/or the method 200 described herein may be implemented in a high level procedural or object oriented programming or scripting language, or a combination thereof, to communicate with or assist in the operation of a computer system, for example the computing device 410. Alternatively, the system for setting up a network and/or the method 200 may be implemented in assembly or machine language. The language may be a compiled or interpreted language. Program code for implementing the system for setting up a network and/or the method 200 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Embodiments of the system for setting up a network and/or the method 200 may also be considered to be implemented by way of a non-transitory computer-readable storage medium having a computer program stored thereon. The computer program may comprise computer-readable instructions which cause a computer, or more specifically the at least one processing unit of the computer, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Various aspects of the system for setting up a network herein-disclosed may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the preferred embodiments set forth in the examples, but should be given the broadest reasonable interpretation consistent with the description as a whole.

What is claimed is:

1. A method performed at a mobile device, the method comprising:
    creating, in a host container located in a host container namespace and running on the mobile device, a plurality of virtual devices in the host container namespace, each virtual device being a virtualized instance of an interface between an operating system running in the host container and a physical device of the mobile device, the physical device is one of a wireless network adapter, an Ethernet adapter, and a universal serial bus adapter;
    associating, by the host container, each one of the virtual devices with a corresponding virtual container hosted by the host container by changing a respective namespace of each virtual device to a namespace of the corresponding virtual container; and
    connecting, by the host container, the virtual devices to the interface associated with the host container to enable communication between the virtual devices and the physical device across the host container.

2. The method of claim 1, wherein the virtual devices are connected to the interface via a kernel of the operating system running in the host container.

3. The method of claim 1, wherein the interface comprises a physical WiFi device interface and a wireless LAN device interface.

4. The method of claim 1, wherein creating a plurality of virtual devices comprises causing a virtual driver to create each virtualized instance of the physical device.

5. The method of claim 4, wherein the virtual driver is one of a FullMAC driver and a SoftMAC driver.

6. The method of claim 1, further comprising instantiating, by the host container, the plurality of virtual containers.

7. The method of claim 1, the plurality of virtual containers belonging to one of a first group of virtual containers and a second group of virtual containers, wherein the first and second groups of virtual containers run different operating systems.

8. The method of claim 1, further comprising managing conflict between the virtual containers via one of virtual drivers of the virtual devices and an arbiter in the host container, which manages the virtual containers.

9. A mobile device, comprising:
    a processing unit; and
    a non-transitory memory communicatively coupled to the processing unit and comprising computer-readable program instructions executable by the processing unit for:
        creating, by a host container located in a host container namespace and running on the mobile device, a plurality of virtual devices in the host container namespace, each virtual device being a virtualized instance of an interface between an operating system running in the host container and a physical device of the mobile device, the physical device is one of a wireless network adapter, an Ethernet adapter, and a universal serial bus adapter;
        associating, by the host container, each one of the virtual devices with a corresponding virtual container hosted by the host container by changing a respective namespace of each virtual device to a namespace of the corresponding virtual container; and
        connecting, by the host container, the virtual devices to the interface associated with the host container to enable communication between the virtual devices and the physical device across the host container.

10. The system of claim 9, wherein the virtual devices are connected to the interface via a kernel of the operating system running in the host container.

11. The system of claim 9, wherein the interface comprises a physical WiFi device interface and a wireless LAN device interface.

12. The system of claim 9, wherein creating a plurality of virtual devices comprises causing a virtual driver to create each virtualized instance of the physical device.

13. The system of claim 9, the program instructions being further executable for instantiating, by the host container, the plurality of virtual containers.

14. The system of claim 9, the plurality of virtual containers belonging to one of a first group of virtual containers and a second group of virtual containers, wherein the first and second groups of virtual containers run a different operating system.

15. The system of claim 9, the program instructions being further executable for managing conflict between the virtual containers via one of: virtual drivers of the virtual devices; and an arbiter in the host container, which manages the virtual containers.

16. A mobile device comprising:
    a host container located in a host container namespace and hosting at least two virtual containers, the host container having access to at least one physical device of the mobile device, the at least one physical device is at least one of a wireless network adapter, an Ethernet adapter, and a universal serial bus adapter;
    the at least one physical device accessible by the host container, the at least one physical device comprising at least one physical device interface between an operating system running in the host container and the at least one physical device; and at least one virtual device associated with each one of the at least two virtual containers and connected to the at least one physical device to enable communication between each virtual device and the at least one physical device across the host container, each virtual device being a virtualized instance of the at least one physical device interface, each virtual device having a respective namespace of a corresponding virtual container.

\* \* \* \* \*

UNITED STATES PATENT AND TRADEMARK OFFICE
CERTIFICATE OF CORRECTION

PATENT NO. : 10,452,419 B2  
APPLICATION NO. : 15/261128  
DATED : October 22, 2019  
INVENTOR(S) : Mohanish Pachlore Page 1 of 1

It is certified that error appears in the above-identified patent and that said Letters Patent is hereby corrected as shown below:

On the Title Page

Item (71) Applicants, Lines 1-3, delete "Mohanish Chandrapalsingh Pachlore, Waterloo (CA); Dongjin Kim, Waterloo (CA); Yin Tan, Waterloo (CA)" and insert --Huawei Technologies Co., Ltd., Shenzhen (CN)--.

Signed and Sealed this  
Tenth Day of December, 2019

Andrei Iancu  
*Director of the United States Patent and Trademark Office*